(12) United States Patent
Park et al.

(10) Patent No.: US 9,944,876 B2
(45) Date of Patent: Apr. 17, 2018

(54) SYSTEM FOR PRODUCING BIOCHAR AND METHOD FOR PRODUCING BIOCHAR

(71) Applicant: KF CO., LTD., Uiwang-si, Gyeonggi-do (KR)

(72) Inventors: Seong-Kyu Park, Seoul (KR); Jai-Young Lee, Seoul (KR)

(73) Assignee: KF CO., LTD., Uiwang-si (KR)

( * ) Notice: Subject to any disclaimer, the term of this patent is extended or adjusted under 35 U.S.C. 154(b) by 0 days.

(21) Appl. No.: 15/119,049

(22) PCT Filed: Feb. 11, 2015

(86) PCT No.: PCT/KR2015/001380
§ 371 (c)(1),
(2) Date: Aug. 15, 2016

(87) PCT Pub. No.: WO2015/122688
PCT Pub. Date: Aug. 20, 2015

(65) Prior Publication Data
US 2017/0051221 A1    Feb. 23, 2017

(30) Foreign Application Priority Data

Feb. 14, 2014 (KR) .................. 10-2014-0017248
Jan. 29, 2015 (KR) .................. 10-2015-0014094

(51) Int. Cl.
*C10L 5/46* (2006.01)
*C10L 3/08* (2006.01)
*C10L 9/08* (2006.01)
*B09B 3/00* (2006.01)
*C10L 5/44* (2006.01)
*F23G 5/027* (2006.01)

(52) U.S. Cl.
CPC .............. *C10L 5/46* (2013.01); *B09B 3/0083* (2013.01); *C10L 3/08* (2013.01); *C10L 5/447* (2013.01); *C10L 9/086* (2013.01); *F23G 5/0273* (2013.01); *C10L 2290/06* (2013.01); *C10L 2290/54* (2013.01); *Y02E 50/10* (2013.01); *Y02E 50/30* (2013.01)

(58) Field of Classification Search
CPC .... C10L 5/46; C10L 3/08; C10L 9/086; C10L 5/447; C10L 2290/06; C10L 2290/54; Y02E 50/10; Y02E 50/30; B09B 3/0083; F23G 5/0273
See application file for complete search history.

(56) References Cited

U.S. PATENT DOCUMENTS 8,580,000 B2 * 11/2013 Sugita .............................. 34/108
2010/0228062 A1 * 9/2010 Babicki ..................... C01B 3/56
585/240

* cited by examiner

*Primary Examiner* — Cephia D Toomer
(74) *Attorney, Agent, or Firm* — Icthus International Law PLLC

(57) ABSTRACT

The present invention relates to a bio-char producing system comprising: a preheating-warming tank for preheating a water-containing organic raw material including food waste; a carbonization reactor for carbonizing, by a hydrothermal carbonization method, the water-containing organic raw material heated at the preheating-warming tank; and an indirect heater provided inside and outside the carbonization reactor to indirectly heat the carbonization reactor through a heating pipe where a heated insulating oil flows inside.

19 Claims, 4 Drawing Sheets

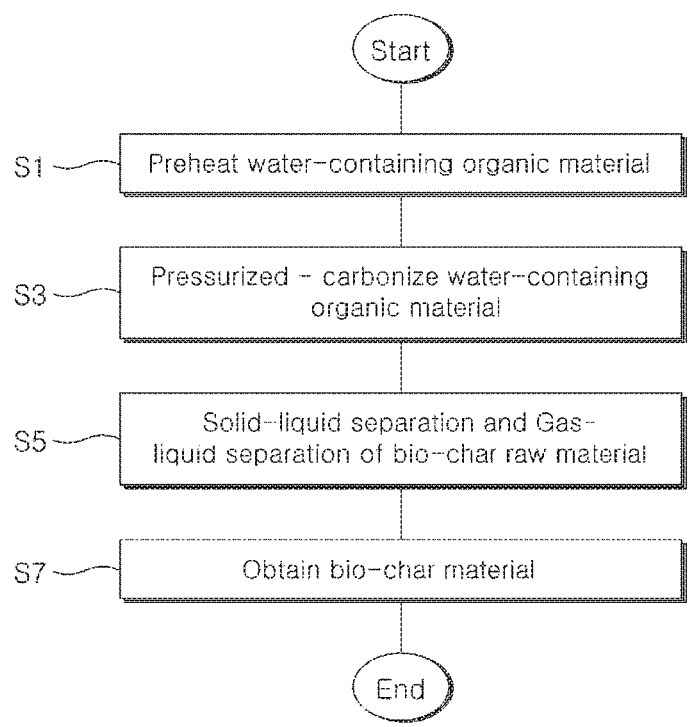

SYSTEM FOR PRODUCING BIOCHAR AND METHOD FOR PRODUCING BIOCHAR

CROSS-REFERENCE TO RELATED APPLICATION(S)

This application is the National Stage entry of International Application No. PCT/KR2015/001380, filed on Feb. 11, 2015, claiming priority to Korean Patent Application Nos. 10-2014-0017248, filed on Feb. 14, 2014, 10-2015-0014094, filed on Jan. 29, 2015, the entire contents of which are incorporated herein by reference in their entirety.

TECHNICAL FIELD

The present invention is related to a system producing a bio char having a high caloric value by carbonizing an organic waste containing water.

The present invention is developed as a result of "Next Generation Eco Innovation Service (The title of the Service: food waste process technical development using Bit-char technology)" No. 2013000150004, which had been managed by Korea Environmental Industry and Technology Institute and supported by Ministry of Environment of Korea.

BACKGROUND ART

Generally, the organic waste such as food waste and sewage sludge had been processed by reclaiming land. However, the organic waste may be easily decomposed due to its high water-content feature to produce bad smell and waste water. Furthermore, the secondary environmental pollution such as the underground contamination may occur because much of leachate flows in the landfill.

So, the carbonization process should be performed after removing the moisture (water) in the organic waste in order to make the high water containing organic waste be the recycling material.

The carbonization process is performed under the anaerobic condition or low-oxygen atmosphere (2~4%) where the organic material is pyrolized by heating through an external heating source to fix carbon on a final product. The most organic waste may be recycled by means of the carbonization process.

With respect to the above mentioned carbonization process, the Korean Publication Patent 2014-002807 disclosed the sludge carbonization system including first dryer where a sludge had been dried, a carbonization unit for carbonizing the dried sludge, and a heated-air supply unit for supplying a heated-air to the dryer and the carbonization unit.

This technology has a dryer using the heated-air which had been burned from a fuel such as LPG and LNG to dry the 8 wt %~30 wt % water containing sludge to move it to the carbonization unit. However, the temperature of the heated-air is not steady so that it cannot dry the inside of the sludge. So, the final product has a low caloric value and a low quality.

Therefore, it is necessary to develop a bio-char producing system which can produce the final product having a high caloric value and minimum consumption energy.

DISCLOSURE

Technical Problem

The present invention has been invented to solve the problems. The present invention may provide a system of producing a bio char and a method for producing a bio char which have outstanding economics because it can produce the excellent bio char by uniformly transferring the heat to the raw material and minimize the energy consumed by using the wasted heat.

Technical Solution

Accordingly, the present invention may provide bio-char producing system comprising: a preheating-warming tank for preheating a water-containing organic raw material including food waste; a carbonization reactor for carbonizing, by a hydrothermal carbonization method, the water-containing organic raw material heated at the preheating-warming tank; and an indirect heater provided inside and outside the carbonization reactor to indirectly heat the carbonization reactor through a heating pipe where a heated insulating oil flows inside.

As one aspect of the invention, the bio-char producing system may further comprises: a inertial impaction type gas-liquid separator for separating a waste fluid produced in the carbonization reactor; a bio liquid tank for storing a drainage liquid separated at the inertial impaction type gas-liquid separator, producing a methane gas by using the drainage liquid, and supplying it to the indirect heater; and a gas tank for storing a emission gas separated at the inertial impaction type gas-liquid separator.

As one aspect of the invention, the bio-char producing system may further comprises: a bio-char storage device storing a bio-char discharged from the carbonization reactor; and a solid-liquid separator separating the bio-char after receiving it from the bio-chare storage device, wherein, a liquid separated at the solid-liquid separator may be transferred to the bio-liquid tank to be stored.

As one aspect of the invention, the bio-char producing system may further comprises a bio-char dryer for secondarily drying a bio-char which had been firstly dried, by means of separation at the solid-liquid separator.

As one aspect of the invention, the solid-liquid separator may comprise any one of a belt press and a spin-dryer.

As one aspect of the invention, the bio-char producing system may further comprise: a solar collector, and a heat storage tank receiving an energy from the solar collector, wherein the preheating-warming tank may use the energy from the heat storage tank.

As one aspect of the invention, the energy of the heat storage tank may be supplied to the bio-liquid tank to increase the temperature of inside of the bio-liquid tank.

As one aspect of the invention, the preheating-warming tank may comprise a transfer pump supplying the water-containing organic raw material through a valve installed at the upper portion of the carbonization reactor.

As one aspect of the invention, the carbonization reactor may comprise an inner container being filled with the water-containing organic raw material; and an outer container spaced from the inner container to form a fluid passage, wherein the heat pipe may comprise, a first sub heat pipe installed at the inside of the inner container; and a second sub heat pipe installed between the inner container and the outer container both to heat the inner container and to purify the emission gas flowed in through the fluid passage.

As one aspect of the invention, the lower portion of the carbonization reactor has a cone-shape for easily emitting the bio char.

As one aspect of the invention, the carbonization reactor may comprise a water content measuring device for measuring a percentage of water content of the water-containing organic raw material and a water supply unit configured to additionally supply a water to the carbonization reactor, if the measured percentage of the water contents by the water contents measuring device is less than a reference value.

As one aspect of the invention, the carbonization reactor may comprise a pressure measuring device for measuring the pressure of the inside and a pressure adjusting device configured to adjust a pressure of the carbonization reactor, if the measured pressure by the pressure measuring device is more than a reference pressure.

As one aspect of the invention, the water-containing organic raw material may have 50~80% of the water content, the pressure of the inside is in a range of 1.0~3.0 MPa, and the preheating reactor may preheat the water-containing organic raw material with 50~90° C.

According to another embodiment of the present invention, a bio-char producing method may comprises: preheating a water-containing organic raw material including food waste at a preheating-warming tank; obtaining a bio-char raw material by carbonizing, by a hydrothermal carbonization method, the pre-heated water-containing organic raw material at the carbonization reactor which is indirectly heated by the indirect heater; producing a methane gas separating the bio-char raw material at a solid-liquid separator and by storing the liquid among it in the bio-liquid tank; and obtaining a bio-char material by dehydrating a solid bio-char separated in the solid-liquid separator.

As one aspect of another embodiment, the method may further comprise supplying the methane gas produced in the bio liquid tank as the fuel for the indirect heater.

As one aspect of another embodiment, the method may further comprise: separating a fluid produced in the carbonization reactor into an emission gas and a drainage liquid in a gas-liquid separator; and supplying the drainage liquid to the bio-liquid tank.

As one aspect of another embodiment, the method may further comprise: supplying the emission gas to a gas tank.

As one aspect of another embodiment, the method further comprise purifying the emission gas collected in the gas tank at a combustion unit of the indirect heater.

Advantageous Effects

According to some of the embodiments of the present invention configured as described above, it is possible to minimize the water content of the bio char produced by the bio char producing system to obtain the high caloric value solid fuel.

Moreover, the had smell or the combustible gas produced in the bio char producing system may be recycled as the heat energy to minimize the energy consumption.

DESCRIPTION OF DRAWINGS

FIG. 5 is a flow chart for explaining the bio char producing method of the other embodiment of the present invention.

BEST MODE

Hereinafter, a bio char producing system and a bio char producing method according to an exemplary embodiment of the present disclosure will be described in more detail with reference to the accompanying drawings.

Figure 1:
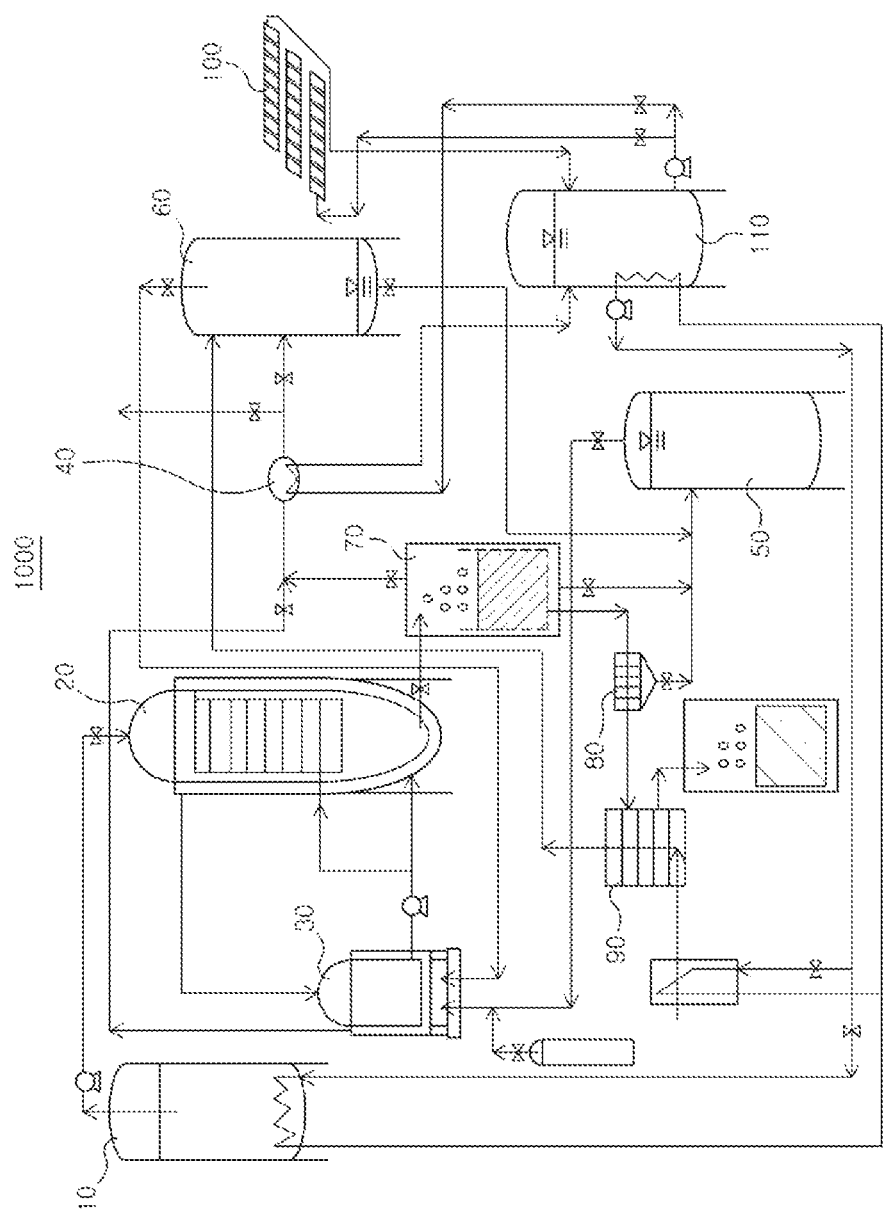
FIG. 1 is a drawing conceptually illustrating a bio-char producing system, according to one embodiment of the present invention.

FIG. 1 is a conceptual drawing for explaining the bio-char producing system, according to one embodiment of the present invention. As shown in FIG. 1, the bio-char producing system 1000 may comprises a preheating warming tank 10, a carbonization reactor 20, an indirect heater 30, a gas-liquid separator 40, a bio liquid tank 50, a gas tank 60, a bio char container 70, a bio char dryer 90, a solar collector 100, and a heat storage tank 110.

Firstly, the water containing organic raw material may go through the pre-treatment process before being injected in the preheating warming tank 10.

Specifically, a grinder (not shown in Figures) may sort the foreign substance included in the raw material to grind it in a size of 10~100 mm, and then supply it to the preheating warming tank 10.

As the grinder, the general grinder having an object of sorting and grinding the foreign substance may be used without any limitation.

At this moment, a product such as the cutter mill, the ball for grinding, and the grinder for the charcoal may be used.

Furthermore, the subject matter of the grinder may not be limited specifically. Any one of the group of stainless steel, copper, urethane, ceramic, rubber, plastic, and natural stone may be used for the grinder.

The water containing organic raw material which gets through the pre-treatment process, may be preheated in the preheating warming tank 10. At this point, the kind of the inputted raw material may not be limited. The example of the raw material may be any one of the group of the food waste, the sewage sludge, and the wood waste. Preferably, the food waste or the sewage sludge may be selected for the raw material.

The preheating warming tank may be preheated at a temperature of 50~90° C.

At this moment, when the temperature of the preheating warming tank 10 is less than 50° C., the carbonization reaction time in the carbonization reactor 20 may be increased because the raw material may not be preheated enough. When the temperature of the preheating warming tank 10 is over 90° C., the moisture contained in the food waste may evaporate and the bad smelling material may be emitted.

Due to this, the carbonization reaction time of the raw material may be reduced, and as a result, the consumption of the fuel may be reduced.

The raw material preheated in the preheating warming tank 10 goes through the carbonization process by inputting the carbonization reactor 20 by means of a transfer pump.

The carbonization reactor 20 carbonizes the preheated raw material in the preheating warming tank 10 to produce the bio char, the bio liquid and the emission gas.

The carbonization reactor 20 carbonizes the preheated raw material by the preheating warming tank 10 under the pressure of 1.0 MPa to 3.0 MPa.

At this moment, when the pressure of the carbonization reactor 20 is less than 1.0 MPa, the ability of reaction may decrease to lower the caloric value of the carbonized material, e.g., the final product. When the pressure of the carbonization reactor 20 is over the 3.0 Mpa, an initial production cost may increase because of consideration of safety of the carbonization reactor due to the high pressure.

Moreover, the carbonization reactor 20 includes a water content measuring device for measuring a percentage of water in the water-containing organic raw material. Accordingly, when a percentage of the water measured by the water content measuring device is less than the reference value, the water may additionally supply in the carbonization reactor to increase the efficiency of the carbonization reaction.

Moreover, the carbonization reactor may further comprise a pressure measuring device for measuring the pressure of the inside and a pressure adjusting device configured to adjust a pressure of the carbonization reactor, if the measured pressure by the pressure measuring device is more than a reference pressure. The operational safety and the production efficiency may be increased.

The heat resource of the carbonization reactor may be a heat medium fluid. Such the carbonization reactor 20 and the indirect heater 30 will be described in FIG. 2 in detail.

The gas-liquid separator 40 is an element for separating (waste) fluid produced in the carbonization reactor 20 into the emission gas and the drainage liquid. This gas-liquid separator 40 may be an inertial impaction type heat exchanger. Namely, the high temperature steam or gas, a waste fluid produced in the carbonization reactor 20, is separated into a drainage liquid and an emission gas in the inertial impaction type heat exchanger, the drainage liquid is supplied to the bio liquid tank 50, and the emission gas is transferred to the gas tank 60. The fluid produced in the carbonization reactor 20 may be produced in the bio char container 70 or the carbonization reactor 20. Here, the emission gas may include the water steam, carbon monoxide (CO), methane gas (CH4) or the had smelling material. It can be burned to be purified in the indirect heater 30. Moreover, the high heat exchanged by the gas-liquid separator 40 is supplied to the heat storage tank 110.

The inertial impaction heat exchanger, one of the gas-liquid separator 40, will be described in detail, referring to the FIG. 3.

On the other hand, a valve formed at the bio char container 70 is open. The emission gas produced in the carbonization reactor 20 goes through the bio char container 70 to the gas-liquid separator 40 by means of the pressure difference.

The high temperature steam or gas emitted from the carbonization reactor 220 orderly goes through the bio liquid tank 70 keeping the bio char and bio liquid and the inertial impaction heat exchanger 40 to be compressed.

The bio char container 70 will be described with FIG. 4.

The high temperature emission gas and steam emitted from the carbonization reactor 20 is liquidated in the heat exchanger 50. Here, the liquidated drainage liquid is collected in the bio liquid tank 50.

Moreover, the bio char producing system may additionally include a gas tank 60 to collect the emission gas.

The gas tank 60 collects the emission gas obtained via the gas-liquid separator 40, the bio char container 70 and so on. The emission gas is burned at the combustion unit formed at the indirect heater 30, and the purified air is emitted externally.

The bio liquid tank 50 collects the drainage liquid flowing in from the solid-liquid separator 80, the bio char container 70 and so on. The drainage liquid contains lots of organic materials, it plays a role in digesting the bio liquid for producing the bio gas such as a methane gas.

The bio liquid tank 50 according to the present invention may additionally include a means for controlling the temperature and the pH to have a proper environment for digesting to produce the methane. According to this means, the temperature may be maintained at 35~40° C. so that the microorganism, such as the bacteria, can produce the fatty acid or the volatile acid.

The fatty acid produced by this process may produce the carbon dioxide, the carbon monoxide, or the methane gas to supply fuel energy to the indirect heater 30.

The drainage liquid produced by the carbonization reaction of the organic waste, the bio liquid, is converted to the methane gas to be supplied as the fuel. So, the environmental contamination may be minimized and the energy consumption may be reduced.

Moreover, the bio liquid tank 50 may additionally include a mixer for equally mixing the drainage liquid to efficiently digest, and a bubble eliminator for eliminating the bubble occurred in the digest.

The bio char emitted from the carbonization reactor 20 according to the present invention is transferred to the spin-dryer, solid-liquid separator 80, to separate the bio char into the solid and the liquid.

The solid-liquid separator 80 may not be limited to one particular separator. For example, any one of the group of a belt press, a filter press, a hydrate-centrifuge using the air-pressure and the like may be used.

At this point, in the bio char flowed in the solid-liquid separator 80, a certain amount of water may be removed to have 30~40% water content as an initial water content.

Generally, the moisture (water) in the food waste is in the form of combined water, so it is difficult to remove the water. However, after carbonization reaction, the combined water may turn into free water. The hydration may easily occur in the physical pressure condition.

The bio-char producing system may additionally include a bio char dryer 90 for drying the bio char.

The bio char gone through the spin-dryer may be transferred to the bio char dryer 90 to remove the water by using the high temperature dryer so that the bio char may have 5~10% water content. The bio char dryer receives the high temperature dried gas from the heat storage tank 110 to dry the bio char.

When the percentage of the water content of the bio char is less than 5%, it may be easily broken to form pellets of solid fuel. When the percentage of the water content of the bio char is more than 10%, the water may come out in keeping, the mold may occur, and as a result the quality of the solid fuel may go down.

As described above, the bio char producing system 1000 according to the present invention, the percentage of the water content may be controlled in the carbonization, the water content of the final product (bio char) may be minimized by the drying process, and finally the solid fuel having the high caloric value may be produced.

On the other hand, the bio char producing system of the present invention may additionally include the heat storage tank 110 to collect the heat of the hot water which is heat-exchanged by the inertial impaction type heat exchanger 50.

The heat storage tank 110 is a device for supplying the heat source of the preheating warming tank 10. It may be adapted out of a general device used in the technical field, so the detail description will be omitted herein.

Meanwhile, the heat storage tank 110 accumulates the heat by receiving the heat from the solar collector 100 and the inertial impaction type heat exchanger 40. Thus, the solar collector 100 and the inertial impaction type heat exchanger 40 may be used to preheat the water-containing organic raw material inside the preheating warming tank 10 to maximize the energy efficiency.

Moreover, the heat of the heat storage tank 110 may be used in the bio char dryer 90 to re-dry the bio char which had been firstly dried by the solid-liquid separator 80.

In the following, the constitution of the carbonization reactor and the related indirect heater will be described in detail in reference to FIG. 2.

Figure 2:
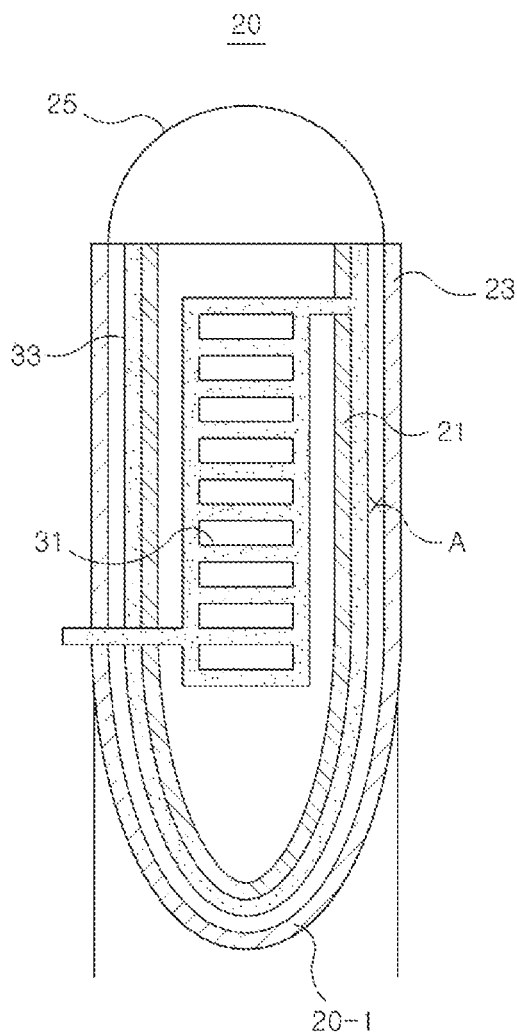
FIG. 2 is a drawing for explaining the constitution of an indirect heater which is related to the carbonization reactor among the bio char producing system of the present invention.

FIG. 2 is a drawing for explaining the constitution of an indirect heater which is related to the carbonization reactor among the bio char producing system of the present invention. As shown in the Figure, the carbonization reactor 20 comprises an inner container 21, an outer container 23 and a lower valve 25. In other words, the carbonization reactor 20 may include the inner container 21 being filled with the raw material and an outer container spaced from the inner container to form a first space portion A.

At this point, the carbonization reactor has a first sub heat pipe 31 in the inner container 21 to uniformly carbonize the raw material filled inside, and a second sub heat pipe 33 is installed at the first space portion A.

The carbonization reactor of the present invention carbonizes the raw material in a temperature range of 150 to 300° C.

In the case that the temperature of the carbonization reactor 20 is less than 150° C., the carbonization reaction of the raw material can be slowed, so the time of the carbonization reaction may be increased. In the case that the temperature of the carbonization reactor 20 is more than 300° C., the thermal etching in the carbonization reactor 20 will be progressed to reduce the life time of the carbonization reactor 20. The percentage of the water content of the organic waste will be decreased too.

The outside wall of the outer container 23 may be made of an insulating material so as to prevent the heat supplied to the first space portion A from being discharged to the outside.

The heat medium fluid may be circulated in the first sub heat pipe 31 installed at the inner container 21 to evenly supply the heat so as to uniformly carbonize the raw material.

The heat medium fluid may flow in the first sub heat pipe 31 and the second sub heat pipe 33 installed at the first space portion. And then, it is emitted from the carbonization reactor 20 and returns to the indirect heater 30.

At this moment, the heat medium fluid is heated to 300~500° C. by the gas burner, the heat source of the indirect heater 30.

In the case that the temperature of the heat medium fluid is less than 300° C., the carbonization reaction of the raw material does not occur well because the heat may not be well-transferred to the organic waste in the inner container 21. So the quality of the product will be lowered. In the case that the temperature is more than 500° C., the organic waste in the carbonization reactor 20 is not carbonized, but gasified. The yield rate can be lowered.

The heat medium fluid (0.4~0.6 cal/g) is lower than the water (1 cal/g) in the specific heat (s.h.). The increase of the temperature is large, the pressure load is low because the pressure is 1/10 of the steam.

Accordingly, the heat medium fluid may flow in the first sub heat pipe 31 and the second sub heat pipe 33 of the first space portion from one side of the carbonization reactor 20 to transfer the heat to the inside of the inner container 21 uniformly. The fuel consumption may be reduced because the additional heat source is not necessary.

Moreover, since heat may be adapted indirectly by using the heat medium fluid, it is possible to reduce the pressure load on the carbonization reactor 20 and the partial heat etching on the lower portion of the carbonization 20. Therefore, the life time of the carbonization reactor 20 will be prolonged.

The water containing organic raw material inputted in the inner container 21 of the carbonization reactor 20 maintains the percentage of the water content 50~80%, properly 60~70%, during the carbonization reaction.

In the case that the percentage of the water content is less than 50%, the speed of increasing the inside pressure of the reactor gets slow to lengthen the carbonization reaction time. The percentage of the water content is less than 80%, the saturated water vapor pressure rapidly increases to be difficult in maintaining the proper temperature. The yield rate of the final product will be degraded.

The auxiliary water tank (not shown in figures) may be additionally included in the carbonization reactor 20 for maintaining the uniform percentage of the water content in the raw material.

Therefore, in the carbonization reactor according to the present invention, the water contained in the raw material is gassed under the high temperature and the high pressure to play role of the catalyst to make the raw material carbonized in the critical status.

Moreover, a pH adjust tank may be additionally installed to adjust the p.H in order to enhance the caloric value of the raw material. The p.H adjust tank which have been used in the technical field may be adapted easily.

Moreover, the emission gas stored in the gas tank 60 is supplied to the first space portion A to be digested by the second sub heat pipe 33 to be purified.

The lower portion 20-1 of the inner container 21 and the outer container 23 of the carbonization reactor 20 has a cone-shape where the diameter becomes smaller in lower direction so as to easily emit the produced material to the bio char container 70, the produced material including the bio char, the bio liquid, and the emission gas.

In detail, after finishing the carbonization reaction, the lower valve installed at the central lower portion of the carbonization reactor 20 opens to emit the produced material in the carbonization reactor 20.

The produced material may include the bio char, the bio liquid, and the emission gas. It is temporarily stored in the emission storage tank 40 described later. The portion of the bio liquid is separated here. The detail explanation will be followed in FIG. 4.

On the other hand, the upper valve is formed at the upper of the carbonization reactor. If the upper valve is open, the water containing organic raw material is supplied to the carbonization reactor 20 by the transfer pump (not shown in Figs.) installed at the preheating warming tank 10.

In the following, the constitution of the inertial impaction type heat exchanger, a kind of the gas-liquid separator for separating the waste fluid into the gas and the liquid produced in the bio char producing system according to the present invention, will be described in detail in referring FIG. 3.

Figure 3:
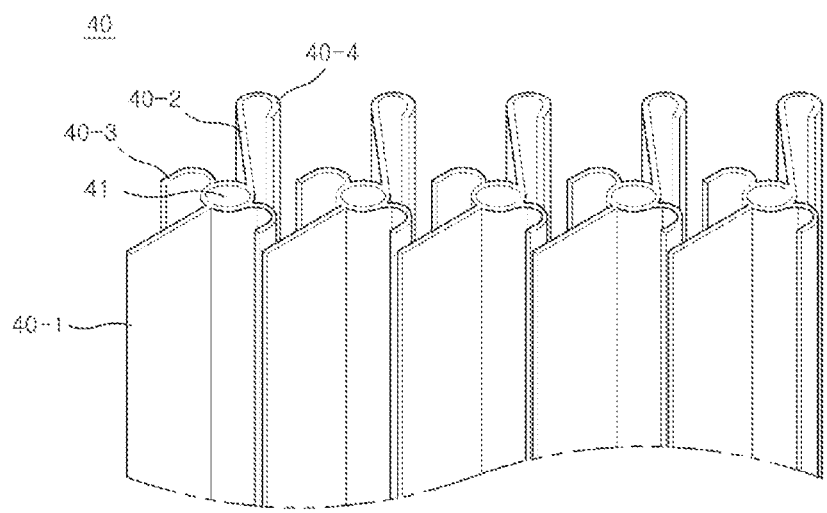
FIG. 3 is a drawing for explaining the constitution of an inertial impaction type heat exchanger which is a kind of the gas-liquid separator separating a waste fluid produced in the bio char producing system of the present invention.

FIG. 3 is a drawing for explaining the constitution of an inertial impaction type heat exchanger which is a kind of the gas-liquid separator separating a waste fluid produced in the bio char producing system of the present invention.

As shown in FIG. 3, the inertial impaction type heat exchanger 40 may include a first blade 40-1 inclined with respect to a flow of the emission gas, the high temperature contaminated gas, by a predetermined angle to thereby be inclined with respect to a direction of a wind of the high temperature emission gas by a predetermined angle, a second blade 40-2 extended from the first blade 40-1 while having a bending angle, and a heat pipe 41 formed at a connection point between the first and second blades 40-1 and 40-2. The gas-liquid separation is made by the heat pipe 41 to produce the drainage liquid. It supplies to the bio liquid tank 50.

Meanwhile, a pair of first blocking blades 40-3 is installed at the connection point between the first and second, blades 40-1 and 40-2. The dust in the emission gas impacts the pair of first blocking blades 35-3, such that it is removed by gravity. Then, the drainage liquid is produced.

In addition, a second blocking blade 40-4 is installed at a rear end portion of the second blade 40-2 to produce the drainage liquid.

At this point, the second blocking blade 40-4 may be extended from the first blocking blade 40-3 with a bending angle. The bending angle may be in a range of 30~60%.

If the bending angle is less than 30%, the collision of the blade and the high temperature emission gas becomes small to reduce the production of the drainage liquid. If the bending angle is more than 60%, the passage of the emission gas gets worse to reduce the production of the drainage liquid.

As described above, the produced inertial impaction type heat exchanger can remove the dust and recycle the energy at the same time.

Figure 4:
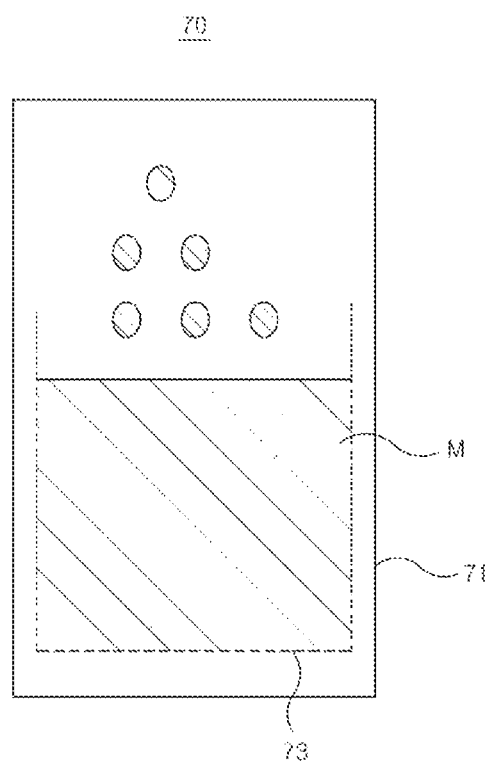
FIG. 4 is a conceptive drawing for explaining the constitution of the bio char container of the bio char producing system of the present invention.

FIG. 4 is a conceptive drawing for explaining the constitution of the bio char container of the bio char producing system of the present invention. As shown in FIG. 4, the bio char container 70 may include a housing 71 and a mesh type inner container.

The bio char M emitted from the carbonization reactor 20 is placed on the mesh type inner container 73. The bio char M contains a lot of water. Accordingly, the water of the bio char is extracted by the gravity through the mesh type container 73. Accordingly, the liquid portion of the bio char is simply separated firstly. Like this, the drainage liquid collected in the housing is supplied to the bio-liquid tank 50, again.

In the following, the bio char producing method in the bio char producing system having the aforementioned elements will be described in detail in reference to FIG. 5.

FIG. 5 is a flow chart for explaining the bio char producing method of the other embodiment of the present invention. As shown in FIG. 5, at first, the water-containing organic raw material including food waste is preheated the preheating-warming tank 10(S1). The preheated water-containing organic raw material is supplied to the carbonization reactor 20 through the upper valve of the carbonization reactor 20 by the transfer pump. On the other hand, the carbonization reactor 20 is indirectly heated by the indirect heater, accordingly the bio char raw material is obtained by carbonizing, by a hydrothermal carbonization method (S3). Next, the solid-liquid separator separates the bio char raw material into the solid and the liquid, and the liquid is stored in the bio liquid tank 50. And, on the fluid produced in the carbonization reactor 20, the gas-liquid separator 40 separates it into the emission gas and the drainage liquid. The drainage liquid is supplied to the bio liquid tank 50(S5). The methane gas is produced by using the drainage liquid in the bio liquid tank 50, and then the methane gas is supplied to the indirect heater 30 as a fuel to maximize the energy efficiency.

On the other hand, the bio char raw material is obtained by a dehydration process on the separated solid bio char resulting from the solid-liquid separator 80(S7).

On the other hand, the emission gas is supplied to the gas tank 60. The emission gas collected in the gas tank 60 can be pured by the burner of the indirect heater 30 to minimize the environmental contamination.

In the following, the present invention will be described in detail through the embodiments as below. However, it is only for the explanation and the scope of the present invention should not be limited by them.

[Embodiment 1] Production of the Solid Fuel from the Food Waste

The food waste is used as the raw material, and it is broken or grounded into small chunks or pieces in size of 50 mm. The 600 kg of ground food waste is put into the preheating warming tank to be preheated in the 70° C. The heating rate of the carbonization reactor (1,000 L) is 5/min to set up 230. Under 2.5 Mpa, the carbonization is performed for 3 hours.

At this point, the food waste in the carbonization reactor is maintained to be at the water content of 67.7%.

After the reaction time, the carbonization reactor is cooled down, the solid (bio char), the liquid (bio liquid), and the gas (emission gas and steam) in the carbonization reactor is moved to the emission container.

Among them, the bio char is moved to the spin-drier to remove the water, and it is moved to the dryer again to be dried with 70° C. drying air for 6 hours to produce the bio char with 5% of the water content.

Next, the dried bio char is formed to the pellet by the molding press. The solid fuel's caloric values are measured, the result is shown with the table 2.

Embodiment 2 to 11 and Comparative Examples 1 and 2

They are carried out under the same condition. The solid fuels had been produced under the condition of table 1.

TABLE 1

| classification | raw material preheating warming tank's temparature (° C.) | carbonization reactor temprature (° C.) | carbonization reactor pressure (Mpa) | heat medium fluid's temprature (° C.) | percentage of water content in the carbonization (%) |
|---|---|---|---|---|---|
| embodiment 1 | 70.0 | 200 | 2.5 | 405.5 | 67.7 |
| embodiment 2 | 91.2 | 200 | 2.5 | 405.5 | 67.7 |
| embodiment 3 | 125.5 | 200 | 2.5 | 405.5 | 67.7 |
| embodiment 4 | 30.5 | 200 | 2.5 | 405.5 | 67.7 |
| embodiment 5 | 70.0 | 130 | 2.5 | 405.5 | 67.7 |
| embodiment 6 | 70.0 | 420 | 2.5 | 405.5 | 67.7 |
| embodiment 7 | 70.0 | 200 | 2.5 | 520.0 | 67.7 |
| embodiment 8 | 70.0 | 200 | 2.5 | 250.0 | 67.7 |
| embodiment 9 | 70.0 | 200 | 2.5 | 405.5 | 35.2 |
| embodiment 10 | 70.0 | 200 | 2.5 | 405.5 | 92.5 |
| embodiment 11 | 70.0 | 200 | 2.5 | 405.5 | 55.0 |
| comparative example 1 | 70.0 | 200 | 0.7 | 405.5 | 67.7 |
| comparative example 2 | 70.0 | 200 | 4.0 | 405.5 | 67.7 |

Embodiment 2~4: The Temperature Change of the Preheating Warming Tank

Embodiment 5~6: The Temperature Change of the Carbonization Reactor

Embodiment 7~8: The Temperature Change of the Heat Medium Fluid (Beyond Range)

Embodiment 9~11: The Percentage of the Water Contents Change in the Carbonization Reactor Comparative Examples 1 and 2: The Pressure Change of the Carbonization Reactor (Beyond Range)

TABLE 2

| classification | caloric value (kcal/kg) |
|---|---|
| embodiment 1 | 6.654 |
| embodiment 2 | 6.115 |
| embodiment 3 | 5.364 |
| embodiment 4 | 6.015 |
| embodiment 5 | 4.985 |
| embodiment 6 | 6.020 |
| embodiment 7 | 5.700 |
| embodiment 8 | 5.280 |
| embodiment 9 | 6.040 |
| embodiment 10 | 5.010 |
| embodiment 11 | 6.420 |
| comparative example 1 | 4.089 |
| comparative example 2 | 4.089 |

As shown in Table 2, the embodiment 1 to 11 produced by the present invention have higher caloric values than the comparative examples 1 and 2.

Especially, the embodiment 1 enhances the reactivity of the food waste comparing to the comparative examples 1 and 2. We can confirm that the caloric value of the bio char, final product, increases.

The bio char producing system of the present invention can minimize the water content of the bio char. So it has an advantage of obtaining the high caloric value solid fuel.

Moreover, the had smelling or the combustible gas, which is produced in the reactor of the bio char producing system in the present invention, may be recycled as the heat energy to minimize the energy consumption.

According to the bio char producing system and the bio char producing method as described, the configuration and the method of the exemplary embodiments described above are not restrictively applied, but all or some of the respective exemplary embodiments may be combined with each other so that the exemplary embodiments may be various modified.

The invention claimed is:

1. A bio-char producing system comprising:
   a tank configured to preheat an organic raw material including water and food waste;
   a carbonization reactor configured to carbonize, by a hydrothermal carbonization method, the organic raw material heated in the tank; and
   a heater provided inside and outside the carbonization reactor to indirectly heat the carbonization reactor through a heating pipe inside of which a heated insulating oil flows.

2. The bio-char producing system of claim 1, further comprising:
   an inertial impaction gas-liquid separator configured to separate a waste fluid produced in the carbonization reactor;
   a bio-liquid tank for storing a drainage liquid separated at the inertial impaction gas-liquid separator, producing a methane gas by using the drainage liquid, and supplying the methane gas to the heater; and
   a gas tank configured to store an emission gas separated at the inertial impaction gas-liquid separator.

3. The bio-char producing system of claim 2, further comprising:
   a bio-char storage device configured to store a bio-char discharged from the carbonization reactor; and
   a solid-liquid separator configured to separate the bio-char, after receiving from the bio-char storage device, into a liquid and a solid material, wherein the liquid separated by the solid-liquid separator is transferred to the bio-liquid tank for storage.

4. The bio-char producing system of claim 3, further comprising:

a bio-char dryer configured to dry a bio-char which had been dried first, by means of separation at the solid-liquid separator.

5. The bio-char producing system of claim 3, wherein the solid-liquid separator comprises any one of a belt press and a spin-dryer.

6. The bio-char producing system of claim 2, further comprising:
a solar collector; and
a heat storage tank configured to receive an energy from the solar collector, wherein the tank configured to preheat the organic raw material including water and food waste uses the energy from the heat storage tank.

7. The bio-char producing system of claim 6, wherein the energy of the heat storage tank is supplied to the bio-liquid tank to increase a temperature inside of the bio-liquid tank.

8. The bio-char producing system of claim 1, wherein the tank comprises a transfer pump supplying the organic raw material through a valve installed at an upper portion of the carbonization reactor.

9. The bio-char producing system of claim 1, wherein the carbonization reactor comprises:
an inner container being filled with the organic raw material; and
an outer container spaced from the inner container to form a fluid passage; and
wherein the heat pipe comprises:
a first sub heat pipe disposed at the inside of the inner container; and
a second sub heat pipe disposed between the inner container and the outer container both to heat the inner container and to purify the emission gas flowed in through the fluid passage.

10. The bio char producing system of claim 9, wherein a lower portion of the carbonization reactor includes a cone-shape for easily emitting the bio-char.

11. The bio-char producing system of claim 1, wherein the carbonization reactor comprises:
a water content measuring device configured to measure a percentage of water content of the organic raw material; and
a water supply unit configured to additionally supply water to the carbonization reactor if the measured percentage of the water content by the water content measuring device is less than a reference value.

12. The bio-char producing system of claim 1, wherein the carbonization reactor comprises:
a pressure measuring device configured to measure pressure of an inside of the carbonization reactor; and
a pressure adjusting device configured to adjust a pressure of the carbonization reactor, if the measured pressure by the pressure measuring device is more than a reference pressure.

13. The bio-char producing system of claim 1, wherein, the organic raw material includes 50~80% of water content, the pressure of the inside is in a range of 1.0~3.0 MPa, and a preheating reactor is configured to preheat the organic raw material at a temperature of 50~90° C.

14. A bio-char producing method comprising:
preheating an organic raw material including water and food waste at a preheating-warming tank;
obtaining a bio-char raw material by carbonizing, by a hydrothermal carbonization method, the pre-heated organic raw material at the carbonization reactor which is indirectly heated by an indirect heater;
producing a methane gas by separating a bio-char raw material by a solid-liquid separator into a liquid and a solid bio-char, and by storing the liquid in a bio-liquid tank; and
obtaining a bio-char material by dehydrating the solid bio-char separated in the solid-liquid separator.

15. The bio-char producing method of claim 14, further comprising supplying the methane gas produced in the bio-liquid tank as a fuel for the indirect heater.

16. The bio-char producing method of claim 14, further comprising:
separating a fluid produced in the carbonization reactor into an emission gas and a drainage liquid in a gas-liquid separator; and
supplying the drainage liquid to the bio-liquid tank.

17. The bio-char producing method of claim 14, further comprising supplying the emission gas to a gas tank.

18. The bio-char producing method of claim 14, further comprising purifying the emission gas collected in the gas tank at a combustion unit of the indirect heater.

19. The bio-char producing method of claim 14, wherein the methane gas is produced from a drainage liquid produced by the carbonization reaction of an organic waste and a bio liquid.

* * * * *